United States Patent [19]

Harrison

[11] Patent Number: 4,848,718
[45] Date of Patent: Jul. 18, 1989

[54] APPARATUS FOR MOLDING HEAT WELDABLE PIPE FITTINGS

[75] Inventor: Gordon Harrison, Notts, England

[73] Assignee: E. I. Du Pont De Nemours and Company, Wilmington, Del.

[21] Appl. No.: 40,840

[22] Filed: Apr. 21, 1987

[30] Foreign Application Priority Data

Apr. 24, 1986 [GB] United Kingdom ................ 8609933

[51] Int. Cl.⁴ ............................................ B29C 45/14
[52] U.S. Cl. .................... 249/91; 264/278; 425/129.1; 425/438; 425/577
[58] Field of Search ............... 264/104, 272.1–272.2, 264/275, 278; 425/116, 176, 129 R, 436, 436 RM, 438, 441, 442, 556, 577, DIG. 5, DIG. 7, DIG. 58, DIG. 247, 123, 125; 249/91, 96, 142, 144, 145, 178, 180

[56] References Cited

U.S. PATENT DOCUMENTS

| | | | |
|---|---|---|---|
| 3,061,503 | 10/1962 | Gould et al. | 156/272 |
| 3,062,940 | 11/1962 | Bauer et al. | 219/19 |
| 3,339,242 | 9/1967 | Lamb | 425/577 |
| 3,843,088 | 10/1974 | McLoughlin et al. | 425/577 |
| 3,987,276 | 10/1976 | Vogelsanger et al. | 219/535 |
| 4,000,240 | 12/1976 | Green et al. | 264/275 |
| 4,075,273 | 2/1978 | Liautaud | 264/272.19 |
| 4,180,542 | 12/1979 | Wrasman | 264/275 |
| 4,362,684 | 12/1982 | Thalmann | 264/230 |
| 4,365,144 | 12/1982 | Reich et al. | 219/535 |
| 4,420,297 | 12/1983 | Remon | 425/577 |
| 4,476,913 | 10/1984 | Leuner et al. | 425/438 |

FOREIGN PATENT DOCUMENTS 1219393 3/1986 U.S.S.R. ............................ 425/438
1440713 6/1976 United Kingdom .

Primary Examiner—Jan H. Silbaugh
Assistant Examiner—Jill L. Heitbrink
Attorney, Agent, or Firm—Donald W. Huntley

[57] ABSTRACT

Apparatus and method for producing heat weldable, thermoplastic, tubular pipe fittings for use with heat weldable piping or tubing using a core in a molding machine having at least one pivoted segment collapsible inwardly of the core, each segment bearing radial projections to facilitate winding a heater wire and/or to receive a terminal post during the molding operation.

8 Claims, 3 Drawing Sheets

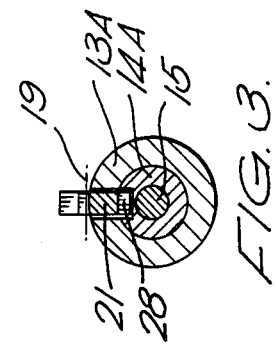
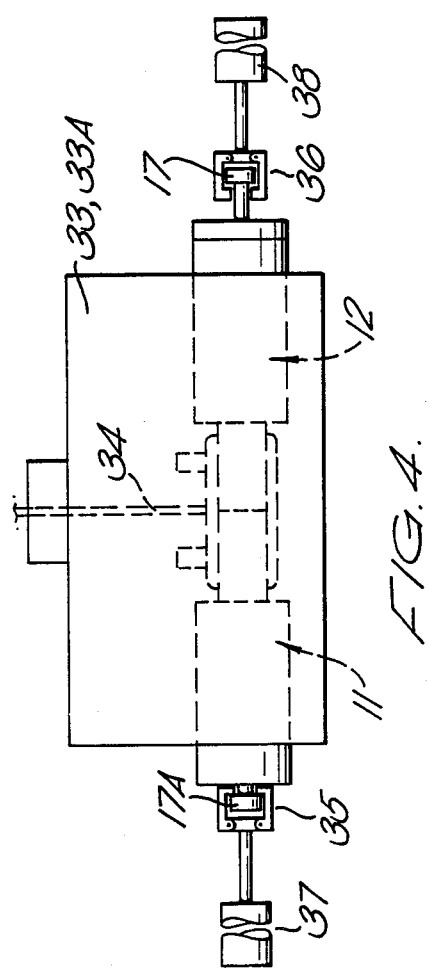

APPARATUS FOR MOLDING HEAT WELDABLE PIPE FITTINGS

BACKGROUND OF THE INVENTION

This invention relates to apparatus and to a method for producing heat weldable, thermoplastic, tubular pipe fittings for use with heat weldable piping or tubing.

Heat weldable thermoplastic tubular fittings are known in which there is, on the inner surface of the fitting, or embedded in the fitting, a coil of wire which enables the fitting to be heated electrically so as to melt the plastic and fuse the fitting to thermoplastic pipes or tubes.

An object of the invention is to provide an improved method and apparatus for producing such pipe fittings.

SUMMARY OF THE INVENTION

In accordance with the present invention there is provided an apparatus for molding heat weldable thermoplastic tubular fittings, the apparatus comprising a core having at least one pivoted segment collapsible inwardly of the core, each segment bearing radial projections adapted to facilitate winding heater wire and to hold the heater wire in position during subsequent moulding. The radial projections may also receive and support terminal posts during a molding operation.

The present invention further provides a method of producing a thermoplastic welding pipe fitting comprising:
  winding a heater wire on the outer surface of a molding core, the molding core having at least one inwardly retractable segments carrying radially projecting posts;
  placing a metallic electrically conductive terminal over each post to provide for attachment of the wire;
  molding the fitting by placing the core in a molding machine and injecting thermoplastic material so as to mold the fitting and terminal post surrounds in situ;
  inwardly retracting each retractable segment to remove the radially projecting posts from the terminals; and
  axially removing the core from the molded fitting.

BRIEF DESCRIPTION OF THE DRAWINGS

FIG. 3 is a section taken on line III shown in FIG. 1; and

FIG. 4 is a diagrammatic illustration of apparatus used to separate core parts to release the molded pipe fitting.

DETAILED DESCRIPTION OF THE INVENTION

Figure 1:
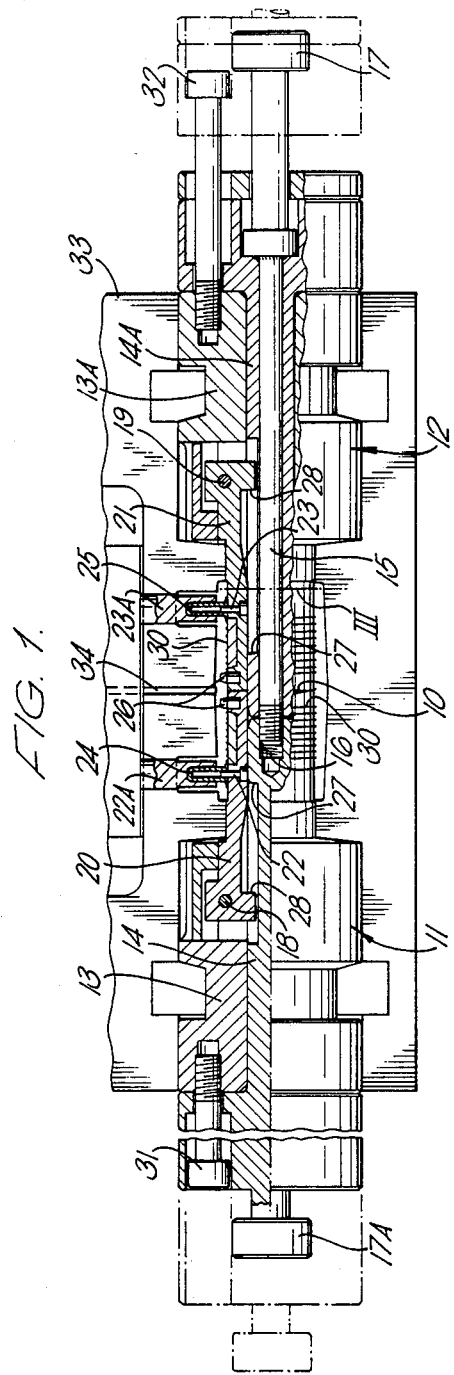
FIG. 1 is an elevation, partly in section, of a molding apparatus embodying the present invention.

A wide variety of thermoplastic materials can be used in the preparation of the tubular fittings prepared according to the present invention, including, for example, homopolymers such as polyethylene, polypropylene, and polybutene; copolymers of ethylene and vinyl esters of aliphatic carboxylic acids such as vinyl acetate and vinyl propionate; copolymers of ethylene and other alpha-olefins such as propylene, butene, hexene and octene; copolymers of ethylene and ethylenically unsaturated carboxylic acids such as acrylic acid, methacrylic acid and the like. Still other classes of thermoplastic materials which can be used include polyacetals, polyvinyl chloride and chlorinated polyvinyl chloride, polyamides and acrylics such as polymethyl methacrylate.

Preferred thermoplastic materials which can be used in the invention include polyethylene, ethylene-octene and ethylene-hexene copolymers.

The molding core used in the present invention may be in two parts, each part carrying one of said pivoted segments, the parts being axially separable.

Preferably each part of the core comprises an outer member on which the segment is pivoted and an inner axially slidable member. The axially slidable members may be interconnected by a bolt which draws the two parts of the core together, the bolt being rotatable so as to release the two parts.

The movement of the segments inwardly may be effected by axial movement of the inner core parts after they have been released.

For instance, each inner core part may have a shoulder adapted to engage a corresponding shoulder on one of the pivoted segments so as to cause it to pivot and withdraw the radial projection inwardly into the body of the core.

Stops may be provided to limit the axially outward movement of the inner core portions.

The outer periphery of the core may be provided with a shallow track or groove onto which the electrical wire may be wound. By arranging for the track to be very shallow in depth, for example, 0.1 mm, it has been found possible to withdraw the two core portions after moulding has been effected without the need to have a totally collapsible core or mandrel.

The method of producing a thermoplastic welding pipe fitting according to the present invention comprises:
  winding a heater wire on the outer surface of a molding core, the molding core having one or more inwardly retractable segments carrying radially projecting posts;
  placing a metallic electrically conductive terminal over each post to provide for attachment of the wire;
  molding the fitting by placing the core in a molding machine and injecting plastic material so as to mold the fitting and terminal post surrounds in situ;
  inwardly retracting each segment to remove the radially projecting posts from the terminals; and
  axially removing the core from the molded fitting.

By use of the invention it is possible to mold the fitting as a single integral molding and in a one-stage molding process.

The invention will be more fully understood by reference to the Figures.

In FIG. 1 a core is shown in position in a molding machine ready for molding to commence. The core is divided into two parts 11 and 12 which meet at the junction 10.

Each of the two parts has an outer core member 13 and 13A and an inner axially retractable core member 14 and 14A. The inner core members 14 and 14A are held together by a bolt 15 threaded into a bore 16. The bolt may be rotated by a head member 17.

Figure 2:
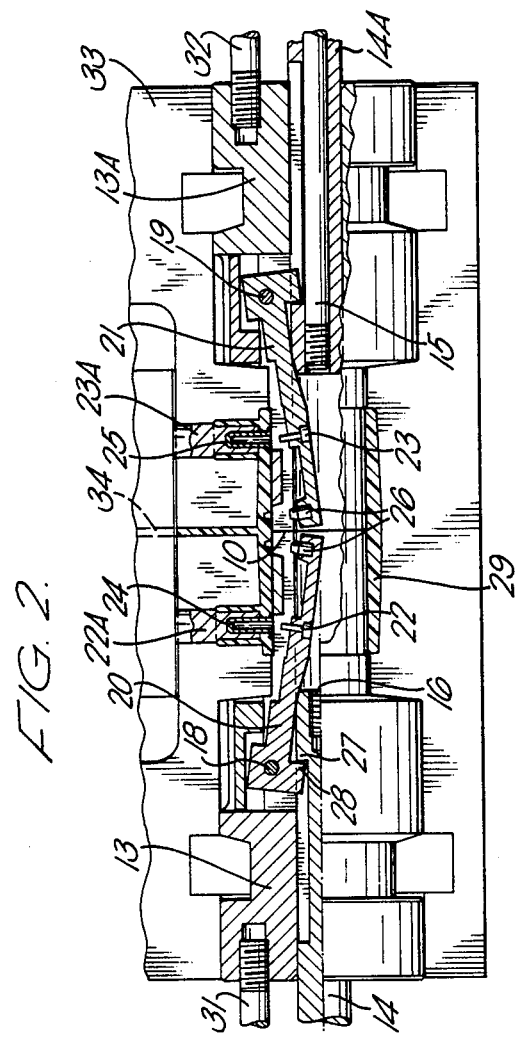
FIG. 2 shows the central portion of the same apparatus after molding of a pipe fitting and with parts shown in different positions.

Pivoted at 18 and 19 in the outer core, members 13 and 13A are two segmental fingers 20 and 21 (see FIGS. 1, 2 and 3). Each segmental finger 20, 21 carries a radial projection 22, 23 respectively, adapted to facilitate winding a heater wire and/or to receive a terminal post 24, 25 during a molding operation.

Each segmental finger 20, 21 also has a small projection 26 and the two projections 26 are arranged to guide and support the wire during winding of the wire and to hold the wire in position during a subsequent molding operation.

The outer portions of the core also have a very shallow continuous spiral or other form of track or groove to receive wire 30 which is wound onto the core before molding commences.

Each inner core portion 14, 14A has a shoulder 27 and the shoulders are adapted, when the inner core members are retracted axially, to abut corresponding shoulders 28 on the collapsible segmental fingers 20 and 21.

In use, before being placed in a two-part mold 33, 33A (one half 33 only being shown in FIGS. 1 and 2) the core is assembled with the two halves of the core held together by the bolt 15 screwed into the bore 16. In this position it will be seen that the segmental fingers 20 and 21 form part of the outer surface of the core and the radial projections 22 and 23 and the small projections 26 extend radially beyond the surface of the core.

Wire is then wound on the outer surface of the core in the shallow trough or groove and the ends of the wire are wound round the post 22, are guided by the posts 26 and then wound around the post 23. Terminals 24 and 25 are attached to the ends of the wire and placed over the posts 22 and 23.

The core assembly is then placed in the mold half 33 and the metal terminals 24 and 25 are enclosed by shroud formers 22A, 23A as the mold is closed. Thermoplastic material such as polythene is then injection molded via passage 34 to form the fitting 29 with the wire 30 embedded in its inner surface and the terminals 24 and 25 molded into the fitting.

The mold may now be opened up and the molded fitting removed on the mold core.

It is now necessary to remove the core from the fitting. This is done by unscrewing the bolt 15 thus allowing the two parts of the core to separate. Before separating the two parts the head member 17 and the corresponding head member 17A are pulled axially and outwardly to the chain line position of FIG. 1 so that the shoulders 27 on the inner portions 14 and 14A of the core contact the shoulders 28 on the segmental fingers 20 and 21 causing the segmental portions to pivot. The finger 20 pivots clockwise and drops into the space within the core thus removing the radial projection 22 and projection 26 from the molded pipe fitting. Similarly the finger 21 pivots counterclockwise thus releasing the projections 23 and 26 from the core.

Stops 31 and 32 are provided to limit the axial movement of the inner core portions relative to the outer core portions and when the full extent of the axial movement of the inner core portions has taken place their outer ends will abut the heads of the stops and the core assembly will be removed axially from within the molded pipe fitting.

Axial movement of the two core parts may be effected by the apparatus shown in FIG. 4. The core parts are shown diagrammatically at 11 and 12 in the mould 33, 33A and are separated by attaching claws 35 and 36 carried on hydraulic rams 37 and 38 to head members 17 and 17A and simultaneously retracting the two parts of the core axially until the core parts are clear of the molded fitting.

Because the wire 30 is wound in a very shallow trough, it has been found possible to remove the core portions without the need to have a totally collapsible core or mandrel, the wire being retained in the molded fitting and simply sliding over the shallow trough.

The purpose of the projections 26 is to guide the wire and allow for change in pitch of the winding. Winding is in the same direction across both sides of the core.

I claim:

1. An apparatus for molding heat weldable thermoplastic tubular fittings, the apparatus comprising a core in cooperation with an outer mold, the core having at least two segments, each said segment pivoted about a single point and collapsible inwardly of the core, each said segment bearing at least one first radial projection extending into a mold cavity formed between the core and the outer mold and a heater wire is wound and held in position around the first radial projections during subsequent molding.

2. An apparatus according to claim 1 further comprising a second radial projection on each said pivoted segment extending into the molding cavity, each said second projection receiving and supporting a terminal post during subsequent molding.

3. An apparatus according to claim 1 in which the core is in two parts, each part bearing one of said pivoted segments, the parts being axially separable.

4. An apparatus according to claim 3 in which each said part of the core comprises an outer member on which each said segment is pivoted about each said single point and an inner axially slidable member.

5. An apparatus according to claim 4 in which the axially slidable members are interconnected by a bolt which draws the two parts of the core together, the bolt being rotatable so as to release the two parts.

6. Apparatus according to claim 4 in which stops are provided to limit the axially outward movement of the inner axially slidable member.

7. Apparatus according to claim 1 in which the outer periphery of the core is provided with a shallow track or groove onto which the electrical wire is wound.

8. Apparatus according to claim 7 in which the track is of such shallow depth that the two core parts are withdrawn after molding and pivoting the two segments without a totally collapsible core.

* * * * *